(12) United States Patent
Picasso et al.

(10) Patent No.: US 8,237,562 B1
(45) Date of Patent: *Aug. 7, 2012

(54) DEALING WITH ROGUE RFID READERS USING TAG IDENTIFIERS

(75) Inventors: Brent A. Picasso, Edmonds, WA (US);
Paul Dietrich, Seattle, WA (US);
Michael J. Dacquisto, Seattle, WA (US);
Joseph Baird, Seattle, WA (US);
Christopher J. Diorio, Shoreline, WA (US); Harley K. Heinrich, Snohomish, WA (US)

(73) Assignee: Impinj, Inc., Seattle, WA (US)

( * ) Notice: Subject to any disclaimer, the term of this patent is extended or adjusted under 35 U.S.C. 154(b) by 730 days.

This patent is subject to a terminal disclaimer.

(21) Appl. No.: 12/272,784

(22) Filed: Nov. 17, 2008

Related U.S. Application Data

(60) Provisional application No. 61/003,632, filed on Nov. 19, 2007, provisional application No. 61/021,595, filed on Jan. 16, 2008.

(51) Int. Cl.
*G08B 13/14* (2006.01)

(52) U.S. Cl. .................. 340/572.1; 340/572.4; 340/10.1
(58) Field of Classification Search ............... 340/572.1, 340/572.4, 539.21, 539.23, 825.49, 825.69, 340/10.1, 10.3, 10.4; 235/383, 385, 451, 235/492, 375, 376, 487
See application file for complete search history.

(56) References Cited

U.S. PATENT DOCUMENTS 7,614,555 B2 * 11/2009 Sullivan et al. ............... 235/451
2009/0315678 A1 * 12/2009 Padmanabhan et al. ..... 340/10.1

* cited by examiner

*Primary Examiner* — Hung T. Nguyen
(74) *Attorney, Agent, or Firm* — Turk IP Law, LLC (57) ABSTRACT

Rogue RFID readers are detected by listening to communication between rogue reader and a tag, capturing an identifier associated with the tag from the communication by the reader or by the tag, and checking the captured identifier to determine whether it is a result of a command from another legitimate reader. Audible or visible alerts may be issued, flags may be set, or messages transmitted to an administrator upon determining the operation of the rogue RFID reader. Based on the alert(s) affected tags or the rogue reader may be jammed or an effect of the illegal transmission by the rogue reader may be reversed or tags replaced.

15 Claims, 10 Drawing Sheets

100

*RFID SYSTEM*

EXEMPLARY SYSTEM SETUP FOR
ROGUE READER DETECTION

EXAMPLE OF ROGUE DETECTION

FIG. 10  ARCHITECTURE OF INTERFACE CONVERTER WITH AGENT AND UTILITY

FIG. 11  SAMPLE OPTIONS FOR AGENT TO CONTROL FUNCTIONALITY OF UTILITY, AS EXPOSED BY INTERFACE CONVERTER

FIG. 12

PLACE OF INTERFACE CONVERTER IN ARCHITECTURE

DEALING WITH ROGUE RFID READERS USING TAG IDENTIFIERS

CROSS REFERENCE TO RELATED APPLICATIONS

This application claims priority from U.S.A. Provisional Application Ser. No. 61/003,632, filed on Nov. 19, 2007, the disclosure of which is hereby incorporated by reference for all purposes.

This application also claims priority from U.S.A. Provisional Application Ser. No. 61/021,595, filed on Jan. 16, 2008, the disclosure of which is hereby incorporated by reference for all purposes.

This application may be found related to commonly assigned, U.S.A. application Ser. No. 12/272,776, filed on Nov. 17, 2008, U.S. Pat. No. 7,982,611, titled "DEALING WITH ROGUE RFID READERS USING READER ATTRIBUTES".

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader reads a tag code, data can be learned about the associated item that hosts the tag, and/or about the tag itself.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

A challenge with RFID systems is the possibility of a rogue RFID reader. Rogue RFID readers may be used to surreptitiously alter tag data from their intended legitimate value, or to surreptitiously alter the tag itself such as by electronically killing or deactivating some or all of the tag's features. The threat exists in many contexts. In a purely commercial context, the loss may be financial. In other contexts, where food or pharmaceuticals are tagged, the loss may be of a different nature.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Briefly, embodiments are directed to dealing with a rogue RFID reader by listening to communication between rogue reader and a tag, capturing an identifier associated with the tag from the communication by the reader or by the tag, and checking the captured identifier to determine whether it is a result of a command from another legitimate reader. According to some embodiments, an audible or visible alert may be issued upon determining the operation of the rogue RFID reader. Affected tags or the rogue reader may be jammed through a jamming signal. According to other embodiments, an effect of the illegal transmission by the rogue reader may be reversed or tags replaced upon determining which tags are affected.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Various embodiments are now described. The specific embodiments as disclosed herein and illustrated in the drawings are not to be considered in a limiting sense. Rather, these embodiments are provided so that this disclosure will be thorough and complete, and will fully convey the scope of the claimed subject matter to those skilled in the art. Indeed, it should be readily apparent in view of the present description that the embodiments may be modified in numerous ways. Among other things, the claimed subject matter may be embodied as devices, methods, software, and so on. Accordingly, the claimed subject matter may take the form of an entirely hardware embodiment, an entirely software embodiment, an entirely firmware embodiment, or an embodiment combining aspects of the above. This description is, therefore, not to be taken in a limiting sense. While various aspects of the claimed subject matter are described with repeated references to an embodiment, this is not an indication that the same embodiment is always referred to.

Figure 1:
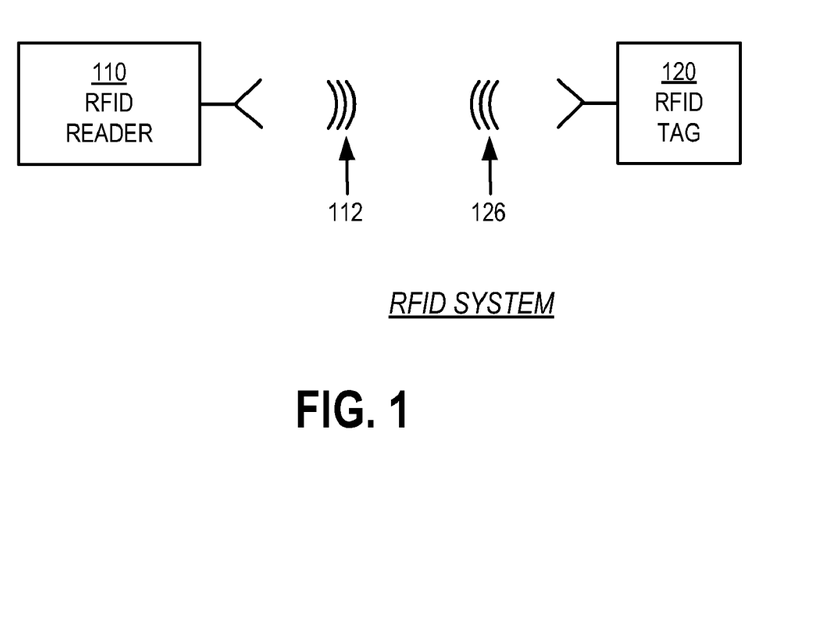
FIG. 1 is a block diagram of components of an RFID system according to embodiments.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are in a suitable range of frequencies. Such ranges include those near 900 MHz, 2.4 GHz, and so on. Generally, the higher the frequency, the faster the data can be exchanged.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e., having its own power source. Where tag 120 is a passive tag, it is powered from wave 112.

Figure 2:
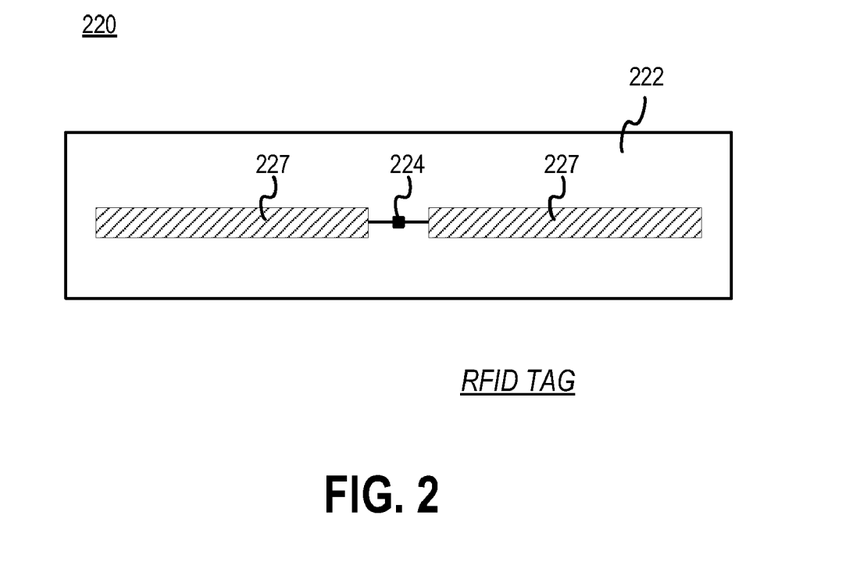
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
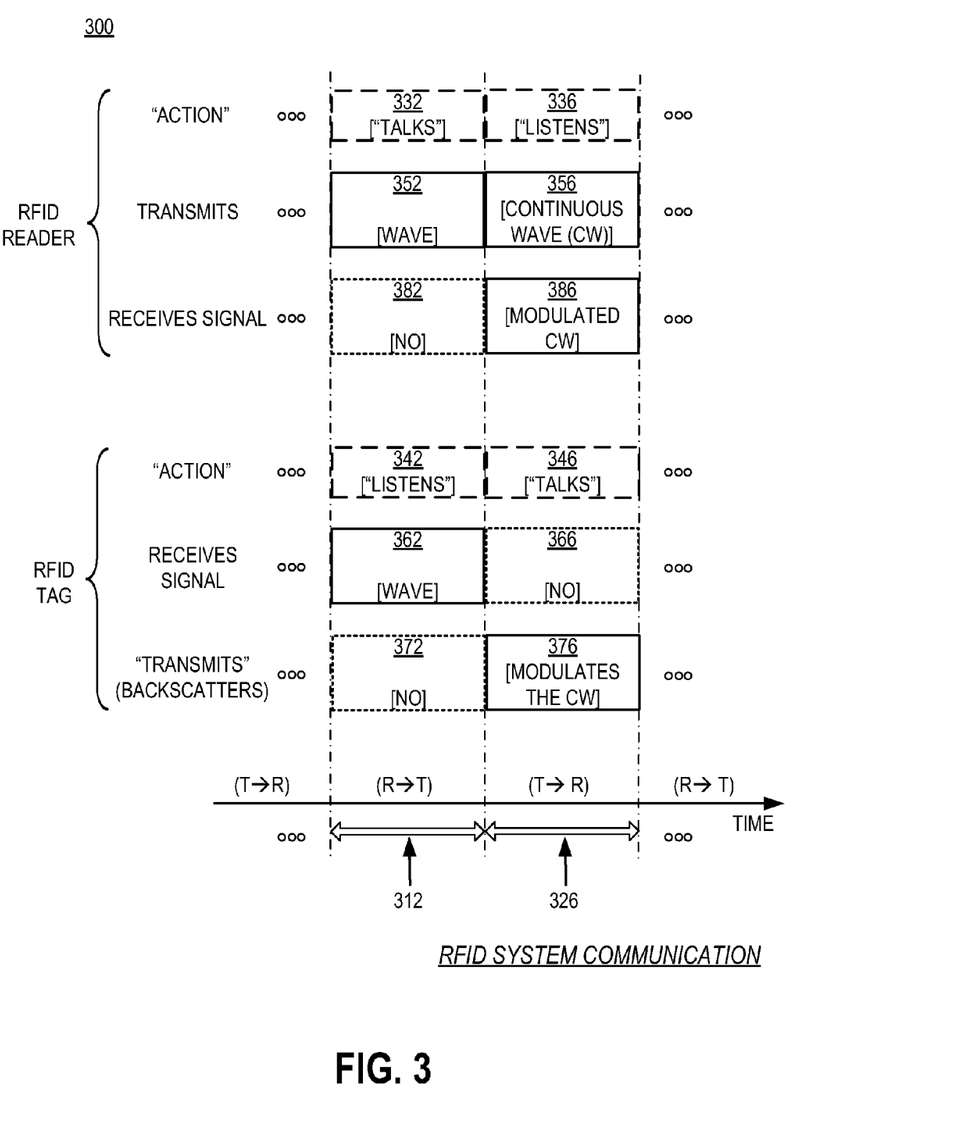
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are described in protocols. A protocol is a specification that calls for specific manners of signaling between the reader and the tags, and vice versa.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

In addition, a protocol can be a variant of a stated specification such as the Gen2 Spec, for example including fewer or additional commands than the stated specification calls for, and so on. In such instances, additional commands are sometimes called custom commands.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

Reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, tag 120 can respond with a backscatter that is modulated onto a frequency, developed by tag 120, that is different from the reader's emitted CW, and this modulated tag frequency is then impressed upon the reader's emitted CW.

This second type of backscatter is called subcarrier backscatter. The subcarrier frequency can be within the reader's channel, can straddle the boundaries with the adjacent channel, or can be wholly outside the reader's channel.

Embodiments of the present disclosure can be useful in different RFID environments, for example, in the deployment of RFID readers in sparse- or dense-reader environments, in environments with networked and disconnected readers such as where a hand-held reader may enter the field of networked readers, or in environments with mobile readers. It will be understood that the present embodiments are not limited to operation in the above environments.

Figure 4:
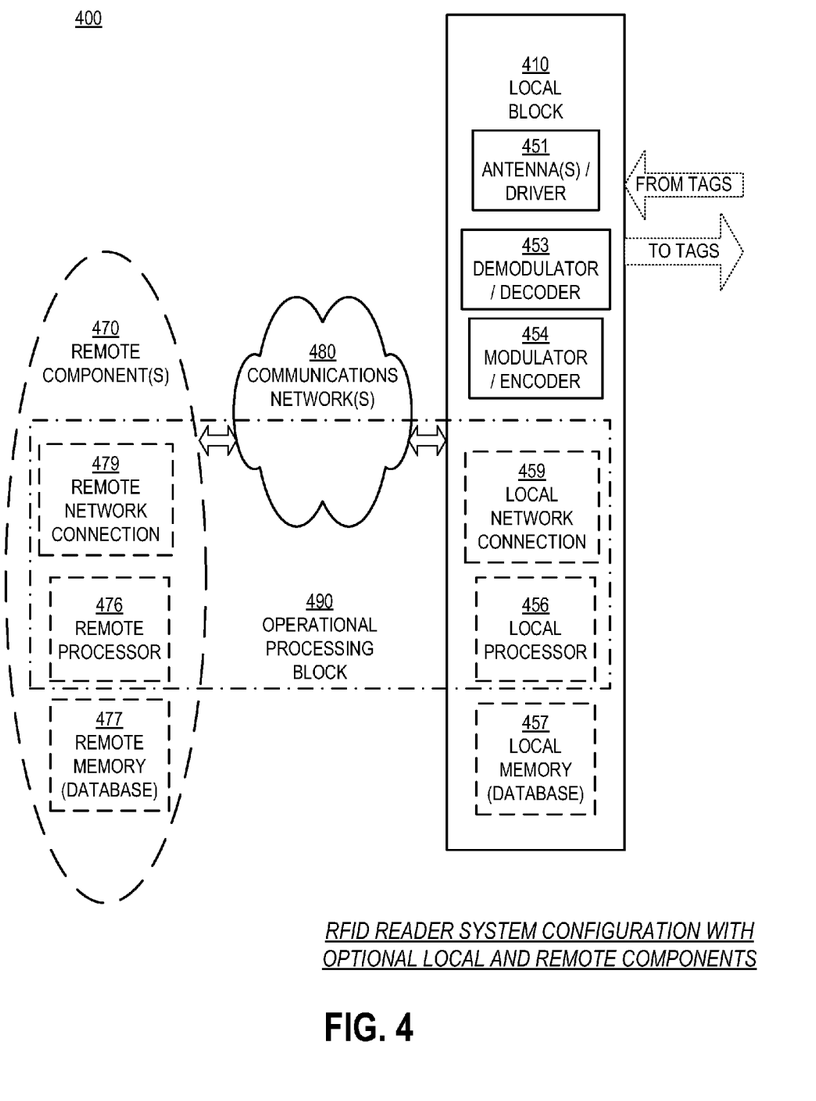
FIG. 4 is a block diagram of a whole RFID reader system according to embodiments.

FIG. 4 is a block diagram of a whole RFID reader system 400 according to embodiments. System 400 includes a local block 410, and optionally remote components 470. Local block 410 and remote components 470 can be implemented in any number of ways. It will be recognized that reader 110 of FIG. 1 is the same as local block 410, if remote components 470 are not provided. Alternately, reader 110 can be implemented instead by system 400, of which only the local block 410 is shown in FIG. 1.

Local block 410 is responsible for communicating with the tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes backscattered waves received from the tags via antenna block 451. Modulator/encoder block 454 encodes and modulates an RF wave that is to be transmitted to the tags via antenna block 451.

Local block 410 additionally includes an optional local processor 456. Processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by processor 456.

Local block 410 additionally includes an optional local memory 457. Memory 457 may be implemented in any number of ways known in the art. Such ways include, by way of examples and not of limitation, nonvolatile memories (NVM), read-only memories (ROM), random access memories (RAM), any combination of one or more of these, and so on. These can be implemented separately from processor 456, or in a single chip, with or without other components. Memory 457, if provided, can store programs for processor 456 to run, if needed.

In some embodiments, memory 457 stores data read from tags, or data to be written to tags, such as Electronic Product Codes (EPCs), Tag Identifiers (TIDs), tag handles, and other data. Memory 457 can also include reference data that is to be compared to the EPC codes, instructions and/or rules for how to encode commands for the tags, modes for controlling antenna 451, and so on. In some of these embodiments, local memory 457 is provided as a database.

Some components of local block 410 typically treat the data as analog, such as the antenna/driver block 451. Other components such as memory 457 typically treat the data as digital. At some point there is a conversion between analog and digital. Based on where this conversion occurs, a whole reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 459 for communicating with network 480.

There can be one or more remote component(s) 470. If more than one, they can be located at the same location, or in different locations. They can access each other and local block 410 via network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Processor 476 can be made in any way known in the art, such as was described with reference to local processor 456.

Remote component(s) 470 can also include a remote memory 477. Memory 477 can be made in any way known in the art, such as was described with reference to local memory 457. Memory 477 may include a local database, and a different database of a Standards Organization, such as one that can reference EPCs.

Of the above-described elements, it is advantageous to consider a combination of these components, designated as operational processing block 490. Block 490 includes those components that are provided of the following: local processor 456, remote processor 476, local network connection 459, remote network connection 479, and by extension an applicable portion of network 480 that links connection 459 with connection 479. The portion can be dynamically changeable, etc. In addition, block 490 can receive and decode RF waves received via antenna 451, and cause antenna 451 to transmit RF waves according to what it has processed.

Block 490 includes either local processor 456, or remote processor 476, or both. If both are provided, remote processor 476 can be made such that it operates in a way complementary with that of local processor 456. In fact, the two can cooperate. It will be appreciated that block 490, as defined this way, is in communication with both local memory 457 and remote memory 477, if both are present.

Accordingly, block 490 is location agnostic, in that its functions can be implemented either by local processor 456, or by remote processor 476, or by a combination of both. Some of these functions are preferably implemented by local processor 456, and some by remote processor 476. Block 490 accesses local memory 457, or remote memory 477, or both for storing and/or retrieving data.

Reader system 400 operates by block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing block 490.

Figure 5:
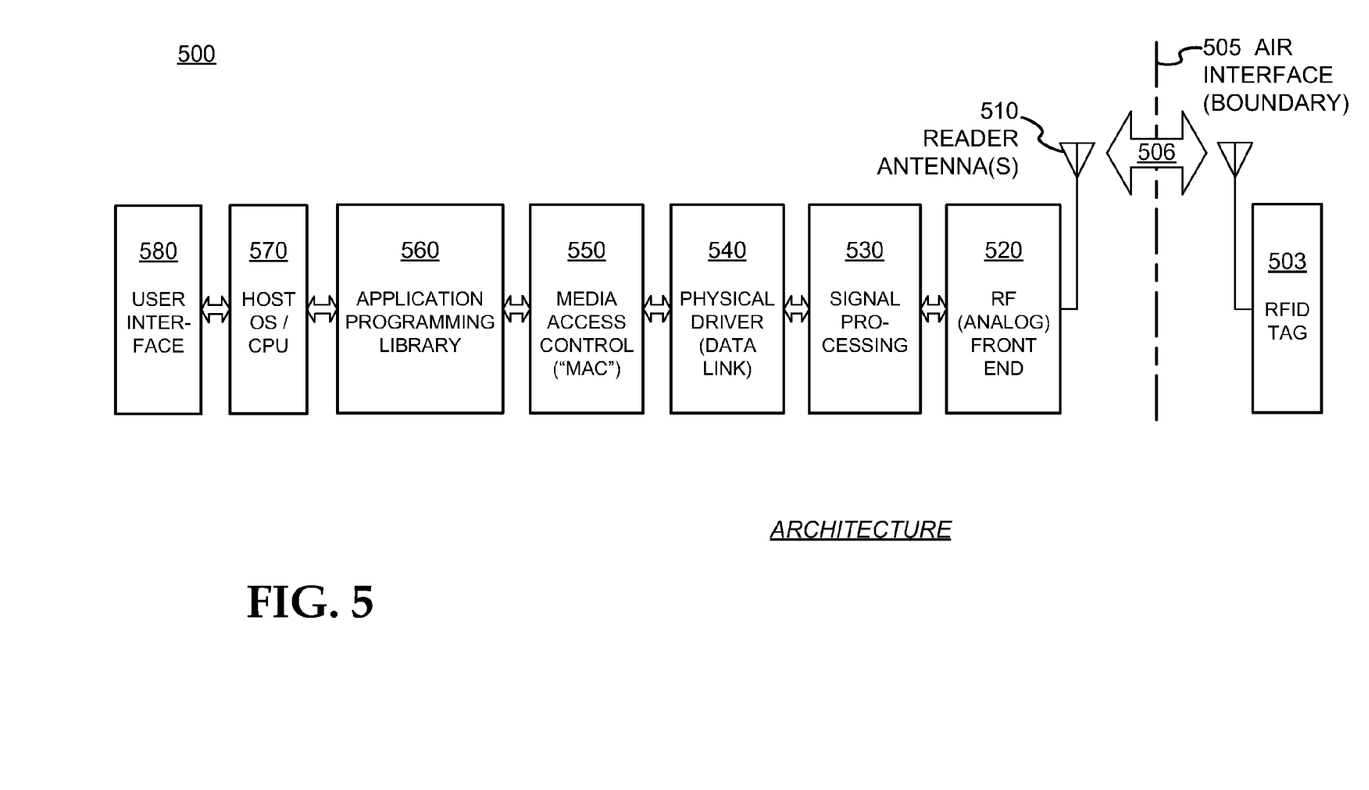
FIG. 5 is a block diagram illustrating an overall architecture of an RFID reader system according to embodiments.

FIG. 5 is a block diagram illustrating an overall architecture of an RFID system 500 according to embodiments. It will be appreciated that system 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself. Tag 503 conducts a wireless communication 506 with the remainder, via the air interface 505. It is noteworthy that air interface 505 is really only a boundary, in that signals or data that pass through it are not intended to be transformed from one thing to another. Specifications as to how readers and tags are to communicate with each other, for example the Gen2 Specification, also properly characterize that boundary an interface.

RFID system 500 includes one or more antennas 510, and an RF Front End 520, for interfacing with antenna(s) 510. These can be made as described above. In addition, Front End 520 typically includes analog components.

System 500 also includes a Signal Processing module 530. In this embodiment, module 530 exchanges waveforms with Front End 520, such as I and Q waveform pairs. In some embodiments, signal processing module 530 is implemented by itself in an FPGA.

System 500 also includes a Physical Driver module 540, which is also known as Data Link. In this embodiment, module 540 exchanges bits with module 530. Data Link 540 can be the stage associated with framing of data. In one embodiment, module 540 is implemented by a Digital Signal Processor.

System 500 additionally includes a Media Access Control module 550, which is also known as MAC layer. In this embodiment, module 550 exchanges packets of bits with module 540. MAC layer 550 can be the stage for making decisions for sharing the medium of wireless communication, which in this case is the air interface. Sharing can be between reader system 500 and tags, or between system 500 with another reader, or between tags, or a combination. In one embodiment, module 550 is implemented by a Digital Signal Processor. In some embodiments, many of the components of modules 520, 530, 540 and 550 can be implemented in one or more Integrated Circuit (IC) chips.

System 500 moreover includes an Application Programming Library module 560. This can include Application Programming Interfaces (APIs), other objects, etc.

All of these functionalities can be supported by one or more processors. One of these processors can be considered a host processor. Such a host processor might include a Host Operating System (OS) and/or Central Processing Unit (CPU) 570. In some embodiments, the processor is not considered as a separate module, but one that includes some of the above-mentioned modules of system 500.

A user interface 580 may be coupled to library 560, for accessing the APIs. User interface 580 can be manual, automatic, or both. It can be supported by the host processor mentioned above, or a separate processor, etc.

It will be observed that the modules of system 500 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 510 as signals, which are in turn processed successively by the various modules in the chain. Processing can terminate in any one of the modules. In a transmitting mode, initiation can be in any one of these modules. Ultimately, signals are routed internally, for antenna(s) 510 to transmit as wireless waves.

The architecture of system 500 is presented for purposes of explanation, and not of limitation. Its particular subdivision into modules need not be followed for creating embodiments according to the invention. Furthermore, the features of the invention can be performed either within a single one of the modules, or by a combination of them.

Figure 6:
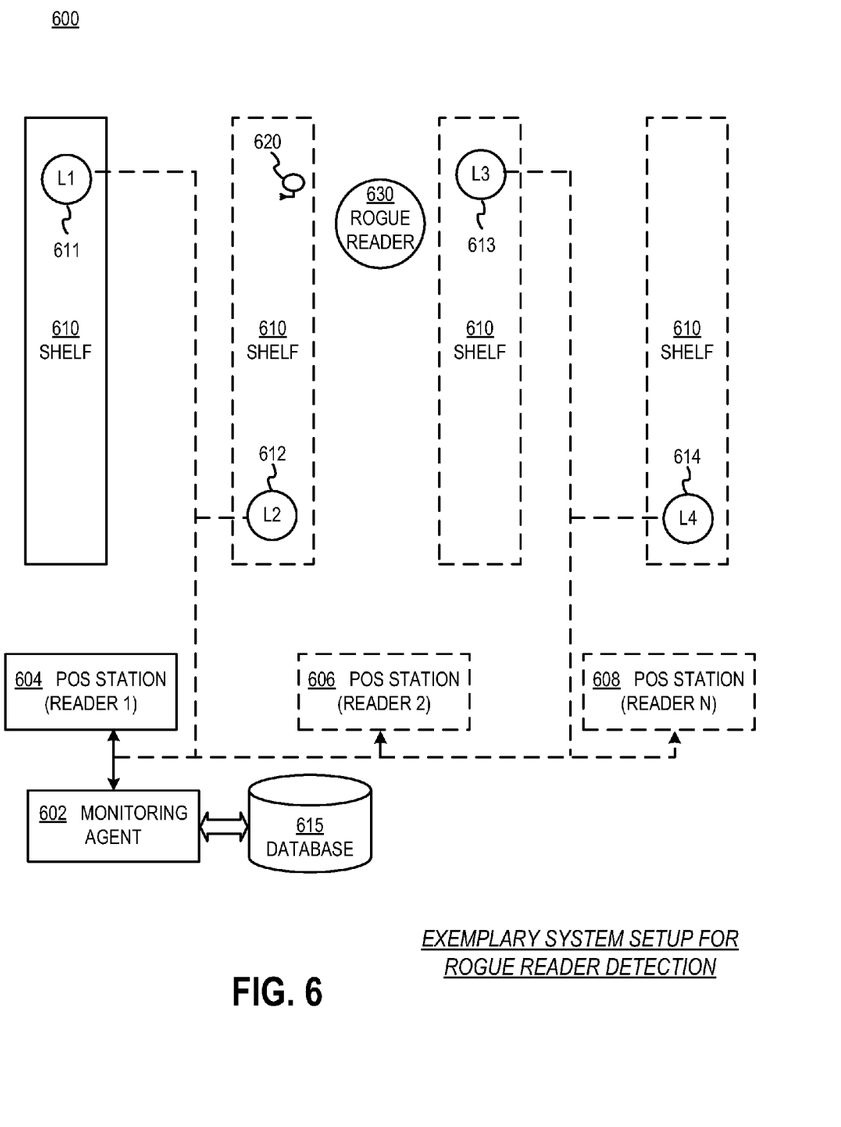
FIG. 6 is a block diagram illustrating an exemplary RFID system setup for detecting a rogue reader according to an embodiment.

FIG. 6 is a block diagram illustrating an exemplary RFID system 600 for detecting a rogue reader according to an embodiment. A typical scenario where a system according to embodiments may be employed includes a retail store setting, where someone with a rogue reader may disable or otherwise alter RFID tags on merchandise and get them past security/Point-Of-Sale (POS) positions without paying for them, or paying for them at a reduced price, or paying for a different item than that to which the tag is attached, or merely disabling or altering the tags for malicious intent.

Diagram 600 includes shelves 610, where merchandise with RFID tags such as tag 620 may be located. The person with rogue reader 630 may be at any location on the premises, or even off the premises.

The system for detecting the rogue reader 630 and possibly remedying any damage may include RFID listening device(s), which may include RF wave detectors (not shown) or RFID readers. The RFID readers may include POS station readers such as 604, 606, 608, or may include readers dedicated to the detecting purpose.

In order to accurately determine a location of the rogue reader and to cover the entire premises, antennas of the RFID readers (e.g. L1 611, L2 612, L3 613, L4 614) or the readers themselves may be located in various locations on the premises, or even off the premises.

The readers may listen to communication between the tags and readers including a rogue reader (and vice versa), and provide captured information to monitoring agent 602, which may capture an identifier associated with an affected tag from the communication such as an identifier associated with a command transmitted to the affected tag, or from the affected tag, and set an alert condition. The determination that the identifier is as a result of an illicit command or from a rogue reader may be made by comparing the identifier to a database 615 of legitimate identifiers.

Monitoring agent 602 may also determine the tag's location (or the rogue reader's location), jam the tag or the reader, or perform other actions based on the set alert condition such as issuing an audible or visible alert, sending a message, and the like.

Figure 7:
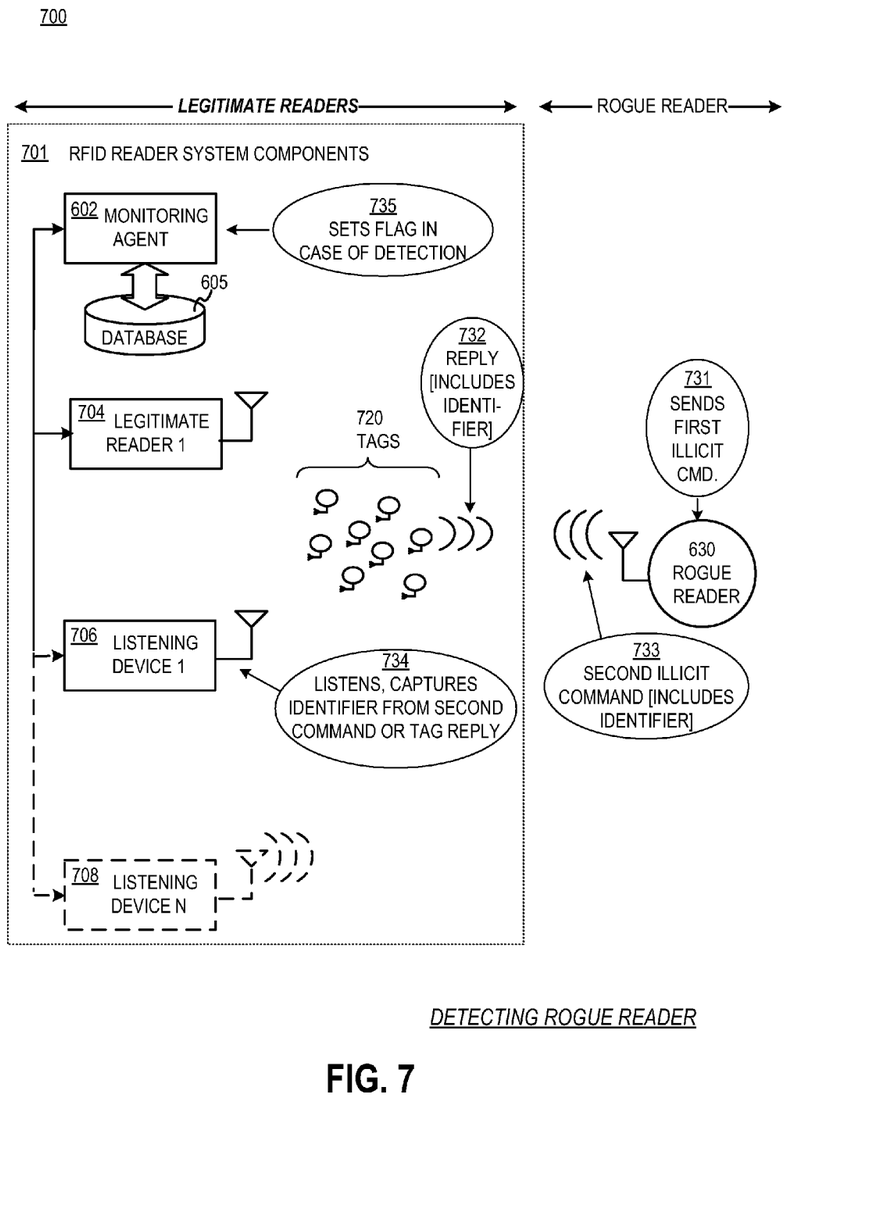
FIG. 7 is a block diagram illustrating how a rogue reader may be detected in the system setup of FIG. 6, according to embodiments.

FIG. 7 is a block diagram 700 illustrating how a rogue reader may be detected in the system setup of FIG. 6, according to embodiments. Diagram 700 includes RFID reader system 701 and rogue reader 630.

RFID reader system 701 may include legitimate reader 1 (704), listening devices 1 through N (706-708), monitoring agent 602, and database 605, as well as tags 720. During an example operation, rogue reader 630 may transmit a first illicit command 731.

One of the tags 720 may reply to the first illicit command (732). The reply may also include an identifier associated with the responding tag. The identifier may be part of the command transmitted by the rogue reader 630.

In response to receiving the tag reply, rogue reader 630 may transmit a second illicit command (733), which may also include the identifier. Meanwhile, at least one of the listening devices (e.g. a reader) may listen to the communication and capture the identifier from the tag reply or the second command from the rogue reader (734).

The identifier may be sent to the monitoring agent 602, which may compare it to a database 605 of known or legitimate identifiers (e.g. each identifier used by the legitimate readers in the system may be recorded for a limited time period for the comparison purposes).

If the identifier is not found in the database, it is determined to be from an illegitimate reader, and the monitoring agent 602 may set an alert condition (e.g. set a flag) as a result of this determination such that the system or an administrator monitoring the system can take appropriate actions.

Figure 8:
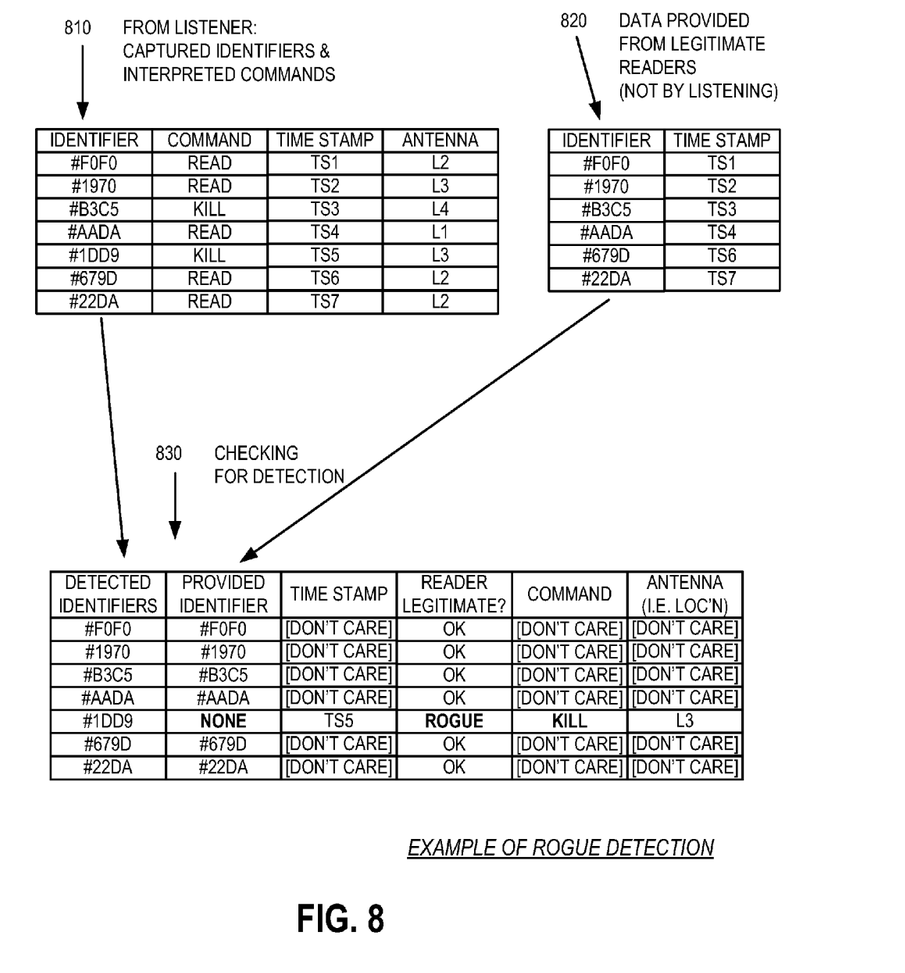
FIG. 8 includes tables illustrating an example of detecting a rogue reader according to an embodiment.

FIG. 8 includes tables illustrating an example of detecting a rogue reader according to an embodiment.

As discussed above, identifiers captured by a listening device may be compared to known or legitimate identifiers. Thus, monitoring agent 602 of FIG. 7 may maintain a table of captured identifiers and associated commands as well as a table of known or legitimate identifiers and associated commands in a file, database, or similar.

The first table may include captured identifiers, associated commands, time stamps associated with the commands, antennas that captured the particular command, and so on (810). The first table may be generated with data received from the listening devices.

The second table may include identifiers and time stamps provided by legitimate readers (820). Although not shown (or needed), associated commands or other information may also be stored for additional purposes.

The third table shows a comparison of the captured and provided identifiers, their associated commands, optionally associated time stamps, associated antenna locations, and the decision based on the comparison (830).

In the example of FIG. 8, the KILL command with identifier #1DD9 and time stamp TS5 is only captured by listening to communications and not provided by any legitimate reader. Therefore, the system can determine that this command was from a rogue reader. Furthermore, a location of the rogue reader may be estimated from the antenna location information received from the listening device(s).

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

According to some embodiments, a method for dealing with a rogue RFID reader communicating with an RFID tag includes capturing an identifier associated with the RFID tag by listening to tag-to-reader communications and/or reader-to-tag communications, determining whether the identifier is transmitted as a result of a command by the rogue RFID reader, and if the identifier is transmitted as a result of a command by the rogue RFID reader, setting an alert condition.

The identifier may also be captured from only the communication from the rogue RFID reader to the RFID tag, or only from the backscattering by the RFID tag. The identifier may include a random number, a tag identification number, an Electronic Product Code (EPC), a handle, a password, data read from tag memory, data to be written to tag memory, a lock payload, a WordCount, a WordPointer, a BlockRange, or a mask. The handle may be a random number. The password may include an Access command password, a Kill command password, or a Lock command password.

The identifier may be forwarded to a database for determining whether the identifier is transmitted as a result of a command by the rogue RFID reader. According to other embodiments, the method may further include listening to the reader-to-tag or tag-to-reader communications while preventing from transmitting at least one legitimate reader, listening to the reader-to-tag or tag-to-reader communications while causing at least one legitimate reader to desist from transmitting a legitimate command to improve the listening for the rogue reader, or listening to the reader-to-tag or tag-to-reader communications while causing at least one legitimate reader to transmit a legitimate command.

The alert condition may be set respective to a certain location within premises, where the RFID tag is located. A handle transmitted by the tag may also be captured, and the certain location determined from the captured handle.

According to further embodiments, the method may also include issuing an audible alert, issuing a visible alert, issuing an electronic alert, or setting a flag. The issued alert may be located remotely enough from a certain location where the RFID tag is located, so that the issued alert is not detectable at the certain location. On the other hand, the issued alert may be located proximately enough to a certain location where the RFID tag is located, so that the issued alert is detectable at the certain location. Issuing the alert may also include sending a message to an operator. The issued alert itself may designate the certain location where the RFID tag is located.

According to yet other embodiments, the method may include causing a jamming signal to be transmitted so as to jam the tag-to-rogue reader communications or to jam the rogue reader from communicating with tags. The method may also include recording transmissions by the readers or the RFID tags at a certain location if the alert condition is set, where recording the transmissions may include recording a reader identification number with each recorded RFID reader transmission. One of the recorded transmissions may be determined as having been transmitted illegally by the rogue reader, and the RFID tag identified from the illegal transmission. Then, an effect of the illegal transmission on the RFID tag may be reversed or an item on which the RFID tag is hosted identified and the RFID tag replaced with another RFID tag on the host item.

Further embodiments may include a system including an RFID listening device and one or more monitoring agents for performing the operations described above, as well as an interface converter operable to control a utility of a reader that includes the operations discussed above.

An economy is achieved in the present document in that a single set of flowcharts is used to describe methods in and of themselves, along with operations of hardware and/or software and/or firmware. This is regardless of how each element is implemented.

Methods are now described more particularly according to embodiments.

Figure 9:
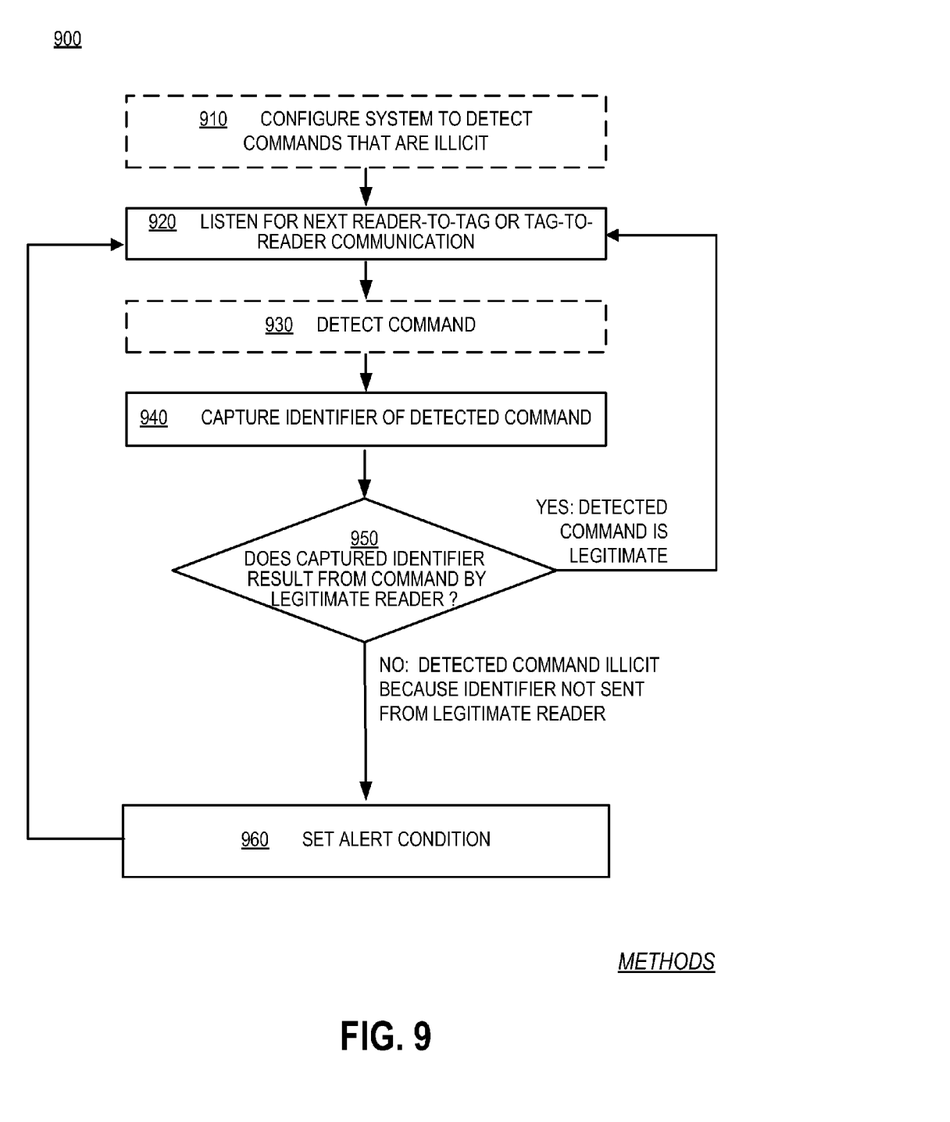
FIG. 9 is a flow chart illustrating a method of detecting a rogue system according to an embodiment.

FIG. 9 is a flow chart 900 illustrating a method of detecting a rogue system according to an embodiment.

According to optional operation 910, a system comprising RFID reader(s), controller(s), and/or RF wave detector(s) is configured to detect illicit commands. In the subsequent operation 920, one of the RFID readers or the RF wave detector begins listening to tag-to-reader communications, reader-to-tag communications, or both.

At next optional operation 930, a command is detected as a result of the listening operation. This operation is followed by operation 940, where an identifier of the detected command is captured. According to other embodiments, the identifier may be associated with other information included in the communication and not necessarily a command.

At decision operation 950 following operation 940, a determination is made whether the captured identifier is as a result of a command from a legitimate reader. This determination may be made by a number of ways as discussed previously. If the decision is affirmative, the detected command is legitimate and processing returns to operation 920. If the decision is negative, the detected command is illicit because the identifier is not associated with a legitimate reader, and processing continues to operation 960.

At operation 960, an alert condition is set based on the determination that the captured identifier did not result from communication of a legitimate reader. The system may perform a number of actions such as those discussed previously following the setting of the alert condition. Processing returns to operation 920 from operation 960 to continue listening to further tag-to-reader communications, reader-to-tag communications, or both.

The operations included in process 900 are for illustration purposes. Dealing with rogue readers using identifiers may be implemented by similar processes with fewer or additional steps, as well as in different order of operations using the principles described herein.

The above described feature can be implemented by a so-called utility of an RFID reader. For example, a utility can include one or more of the above described components, operational processing blocks, an article of manufacture, etc. The invention further provides interfacing, to expose a functionality of this utility to an agent, as is described in more detail below.

Figure 10:
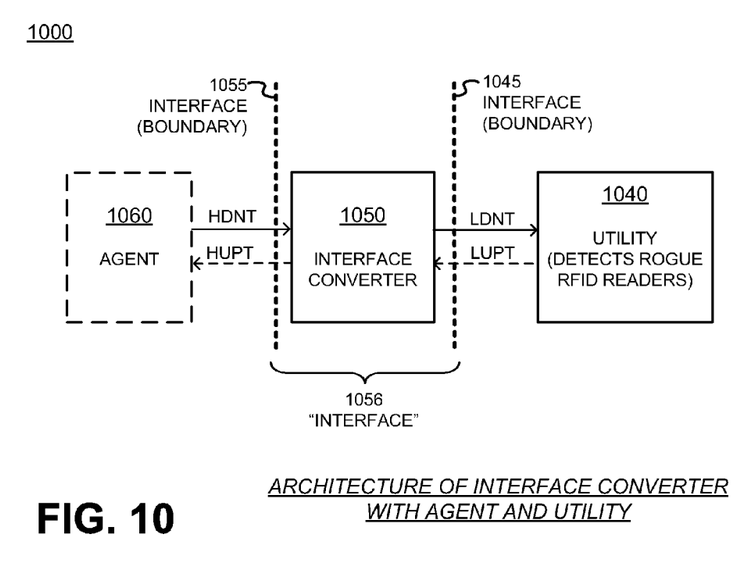
FIG. 10 is a block diagram illustrating an architecture for an interface converter according to embodiments.

FIG. 10 is a block diagram illustrating architecture 1000 for an interface converter according to embodiments. Architecture 1000 includes a utility 1040, which is a mechanism for performing some or all of the reader features described above.

More particularly, utility 1040 includes the capture of identifiers from listened-to tag-to-reader communications, reader-to-tag communications, or both, and determination of whether or not the communication or a command included in the communication is from a legitimate reader based on the captured identifier.

Architecture 1000 additionally includes an interface converter 1050, and an agent 1060. Agent 1060, interface converter 1050, and utility 1040 can be implemented in any way known in the art. For example, each can be implemented in hardware, middleware, firmware, software, or any combination thereof. In some embodiments, agent 1060 is a human.

The invention also includes embodiments of interface converter 1050, and methods of operation of an interface converter such as interface converter 1050. Interface converter 1050 thus enables agent 1060 to control utility 1040. Interface converter 1050 is so named because it performs a conversion, a change, as will be described in more detail below.

Between interface converter 1050 and agent 1060 and utility 1040 there are respective boundaries 1055, 1045. Boundaries 1055, 1045 are properly called interfaces, in that they are pure boundaries, as is the above described air interface.

In addition, it is a sometimes informal usage to call the space between boundaries 1055 and 1045, which includes interface converter 1050, an "interface" 1056. Further, it is common to designate this space with an arrow as shown, with an understanding that operations take place within the arrow. So, while "interface" 1056 is located at a boundary between agent 1060 and utility 1040, it is not itself a pure boundary. Regardless, the usage of "interface" 1056 is so common for interface converter 1050 that this document sometimes also refers to it as an interface. It is clear that embodiments of such an "interface" 1056 can be included in this invention, if they include an interface converter that converts or alters one type of transmission or data to another, as will be seen below.

Agent 1060 can be one or more layers in a layered architecture. For example, agent 1060 can be something that a programmer programs to. In alternative embodiments, where agent 1060 is a human, interface converter 1050 can include a screen, a keyboard, etc. An example is now described.

Figure 11:
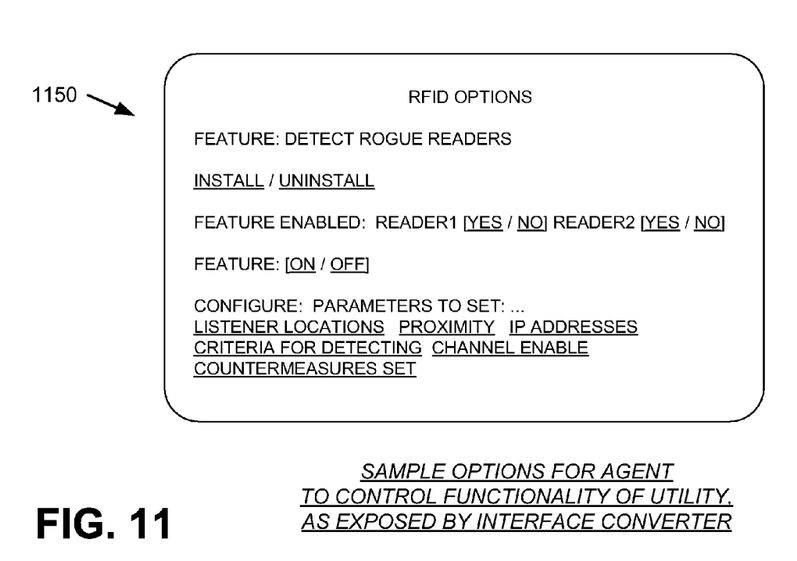
FIG. 11 is an illustrative screenshot for an agent to control a utility as is exposed by the interface converter of FIG. 10, according to an embodiment.

FIG. 11 is a sample screenshot 1150 of an interface converter, such as the interface converter of FIG. 10. Screenshot 1150 can be that of a computer screen for a human agent, according to an embodiment. What is displayed in screenshot 1150 exposes the functionality of a utility, such as utility 1040. Inputs by the user via a keyboard, a mouse, etc., can ultimately control utility 1040. Accordingly, such inputs are received in the context of screenshot 1150. These inputs are determined from what is needed for controlling and operating utility 1040. An advantage with such interfacing is that agent 1060 can prepare RFID applications at a higher level, without needing to know how to control lower level RFID operations. Such lower level RFID operations can be as described in the Gen2 Spec, in other lower level protocols, etc.

Returning to FIG. 10, interface converter 1050 can be implemented in any number of ways. One such way is as a software Application Programming Interface (API). This API can control or provide inputs to an underlying software library, and so on.

Transmissions can be made between agent 1060, interface converter 1050, and utility 1040. Such transmissions can be as input or can be converted, using appropriate protocols, etc. What is transmitted can encode commands, data, etc. Such transmissions can include any one or a combination of the following: a high down transmission HDNT from agent 1060 to interface converter 1050; a low down transmission LDNT from interface converter 1050 to utility 1040; a low up transmission LUPT from utility 1040 to interface converter 1050; and a high up transmission HUPT from interface converter 1050 to agent 1060. These transmissions can be spontaneous, or in response to another transmission, or in response to an input or an interrupt, etc.

Commands are more usually included in transmissions HDNT and LDNT, for ultimately controlling utility 1040. Controlling can be in a number of manners. One such manner can be to install utility 1040, or just a feature of it. Such installing can be by spawning, downloading, etc. Other such manners can be to configure, enable, disable, or operate utility 1040, or just a feature of it. These commands can be standalone, or carry parameters, such as data, etc. In some embodiments interface converter 1050 can convert these commands to a format suitable for utility 1040.

Data is more usually included in transmissions HUPT and LUPT. The data can inform as to success or failure of executing an operation. The data can also include tag data, which can be both codes read from tags, and data about reading tags, such as time stamps, date stamps, etc. The data can also include listened-to reader-to-tag communications, tag-to-reader communications, or both. In some embodiments interface converter 1050 can convert the data to a format suitable for agent 1060, including in some cases aggregating, filtering, merging, or otherwise altering the format or utility of the data.

It should be noted that, what passes across a single pure boundary can be unchanged, by the mere definition of what is a pure boundary. But what passes through interface converter 1050 can be changed or not. More particularly, high down transmission HDNT can be being encoded similarly to, or differently from, low down transmission LDNT. In addition, low up transmission LUPT can be being encoded similarly to, or differently from, high up transmission HUPT. When different, it can be attributed to interface converter 1050, which performs a suitable change, or conversion, of one transmission to another. The change, or conversion, performed by interface converter 1050 is for exposing the functionality of utility 1040 to agent 1060, and vice versa. In some embodiments, a command is converted, but a parameter is passed along without being converted. Plus, what is not converted at one module may be converted at another. Such modules taken together can also form an interface converter according to embodiments.

Figure 12:
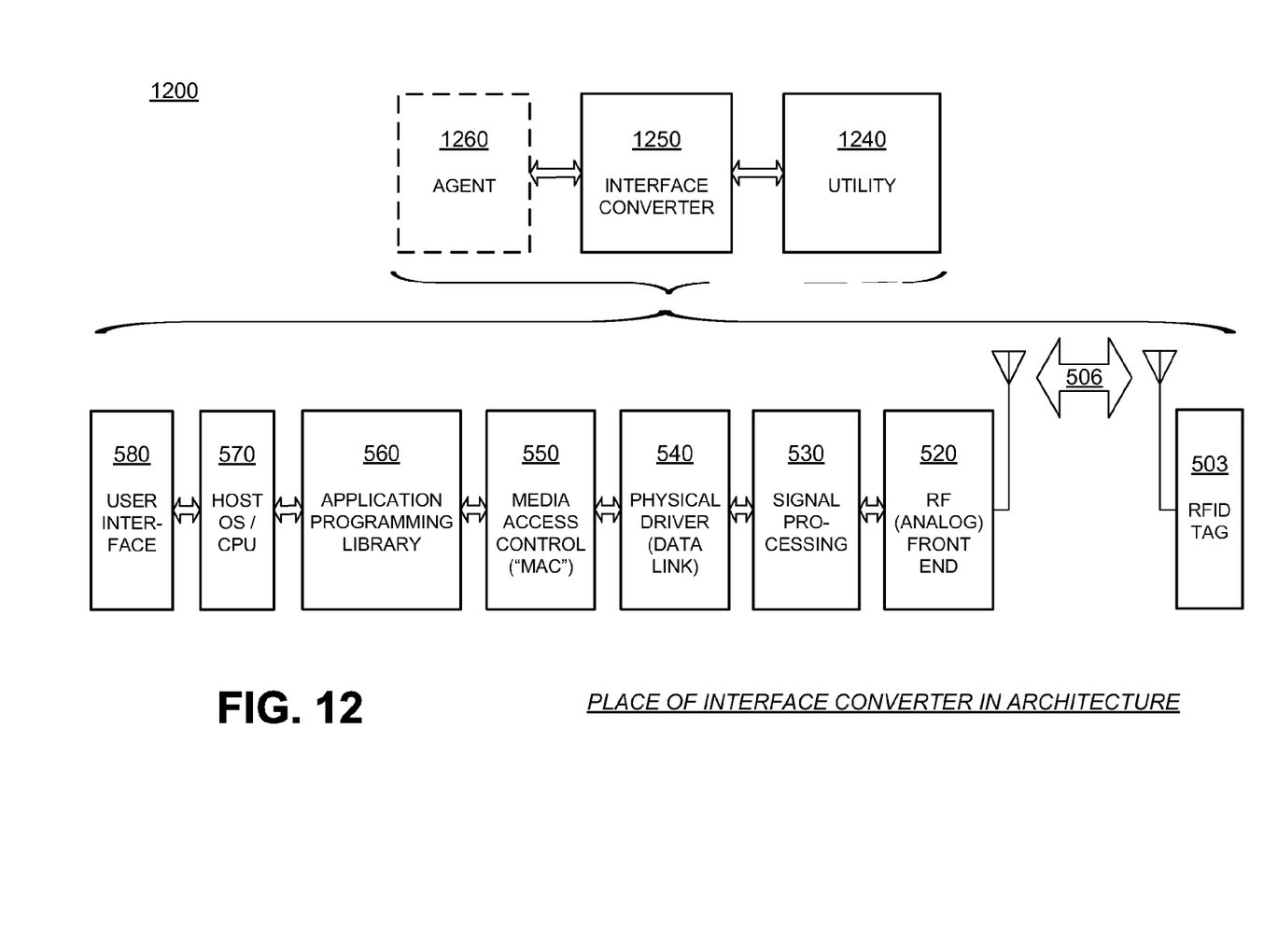
FIG. 12 is a diagram for showing a correspondence for how components of FIG. 10 can be implemented by those of FIG. 5, in embodiments where the interface converter is implemented by a reader.

Agent 1060, interface converter 1050, and utility 1040 can be implemented as part of a reader, or as a different device. For being implemented as part of a reader, FIG. 12 suggests a scheme 1200 where agent 1060, interface converter 1050, and utility 1040 can be implemented in connection with respective reader modules or listener modules that are suitable, depending on the requirements.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for mitigating communications between a rogue Radio Frequency Identification (RFID) reader and an RFID tag, comprising:

capturing an identifier associated with the tag by listening to at least one of a tag-to-reader communication and a reader-to-tag communication, wherein the identifier is at least one from a set of: a random number, a tag identification number, an Electronic Product Code (EPC), a handle, a password, data read from tag memory, data to be written to tag memory, a lock payload, a WordCount, a Word Pointer, a BlockRange, and a mask;

determining, based on a comparison with known and/or legitimate identifiers, whether the captured identifier is a result of communications between the rogue reader and the tag;

wherein the determining is performed by a monitoring agent; and further comprising setting an alert condition if a rogue reader is detected, wherein the alert condition is at least one from a set of: issuing an audible alert, issuing a visible alert, issuing an electronic alert, and setting a flag.

2. The method of claim 1, wherein the password includes one from a set of: an Access command password, a Kill command password, and a Lock command password.

3. The method of claim 1, further comprising:
capturing at least one from a set of: a command, a time stamp, and an antenna associated with the communications, wherein the comparison is additionally based on the at least one of the command, the time stamp, and the antenna.

4. The method of claim 1, further comprising listening to the communications while preventing at least one legitimate reader from transmitting.

5. The method of claim 1, wherein the alert condition is set respective to a location within premises, and the tag is at the location within the premises.

6. The method of claim 1, further comprising jamming the communications if a rogue reader is detected.

7. The method of claim 1, further comprising:
if communications between a rogue reader and a tag are detected, then identifying the tag and reversing an effect of the communications.

8. A system capable of mitigating communications between a rogue Radio Frequency Identification (RFID) reader and an RFID tag, comprising:
at least one RFID listening device to capture an identifier associated with the tag by listening to at least one of a tag-to-reader communication and a reader-to-tag communication, wherein the identifier is at least one from a set of: a random number, a tag identification number, an Electronic Product Code (EPC), a handle, a password, data read from tag memory, data to be written to tag memory, a lock payload, a WordCount, a WordPointer, a BlockRange, and a mask;
at least one monitoring agent configured to: determine, based on a comparison with known and/or legitimate identifiers, whether the captured identifier is a result of communications between the rogue reader and the tag; and
further comprising setting an alert condition if a rogue reader is detected, wherein the alert condition is at least one from a set of: issuing an audible alert, issuing a visible alert, issuing an electronic alert, and setting a flag.

9. The system of claim 8, wherein the password includes one from a set of: an Access command password, a Kill command password, and a Lock command password.

10. The system of claim 8, wherein the listening device is further configured to capture at least one from a set of: a command, a time stamp, and an antenna associated with the communications, and wherein the comparison is additionally based on the at least one of the command, the time stamp, and the antenna.

11. The system of claim 8, wherein the listening device is further configured to listen to the communications while preventing at least one legitimate reader from transmitting.

12. The system of claim 8, wherein the alert condition is set respective to a location within premises, and the tag is at the location within the premises.

13. The system of claim 8, wherein the monitoring agent is further configured to jam the communications if a rogue reader is detected.

14. The system of claim 8, wherein the monitoring agent is further configured to:
if communications between a rogue reader and a tag are detected, then identify the tag and reverse an effect of the communications.

15. An interface converter operable to control a utility of a Radio Frequency Identification (RFID) reader that is capable of mitigating communications between a rogue Radio Frequency Identification (RFID) reader and an RFID tag, the interface converter capable of actions, comprising:
receiving a high down transmission to control the utility in a first manner for:
capturing an identifier associated with the tag by listening to at least one of a tag-to-reader communication and a reader-to-tag communication, wherein the identifier is at least one from a set of: a random number, a tag identification number, an Electronic Product Code (EPC), a handle, a password, data read from tag memory, data to be written to tag memory, a lock payload, a WordCount, a Word Pointer, a BlockRange, and a mask;
determining, based on a comparison with known and/or legitimate identifiers, whether the captured identifier is a result of communications between the rogue reader and the tag;
responsive to the high down transmission, transmitting a low down transmission to control the utility in the first manner, the low down transmission being encoded differently than the high down transmission at least in part; and
further comprising setting an alert condition if a rogue reader is detected, wherein the alert condition is at least one from a set of: issuing an audible alert, issuing a visible alert, issuing an electronic alert, and setting a flag.

* * * * *